Figure 1:
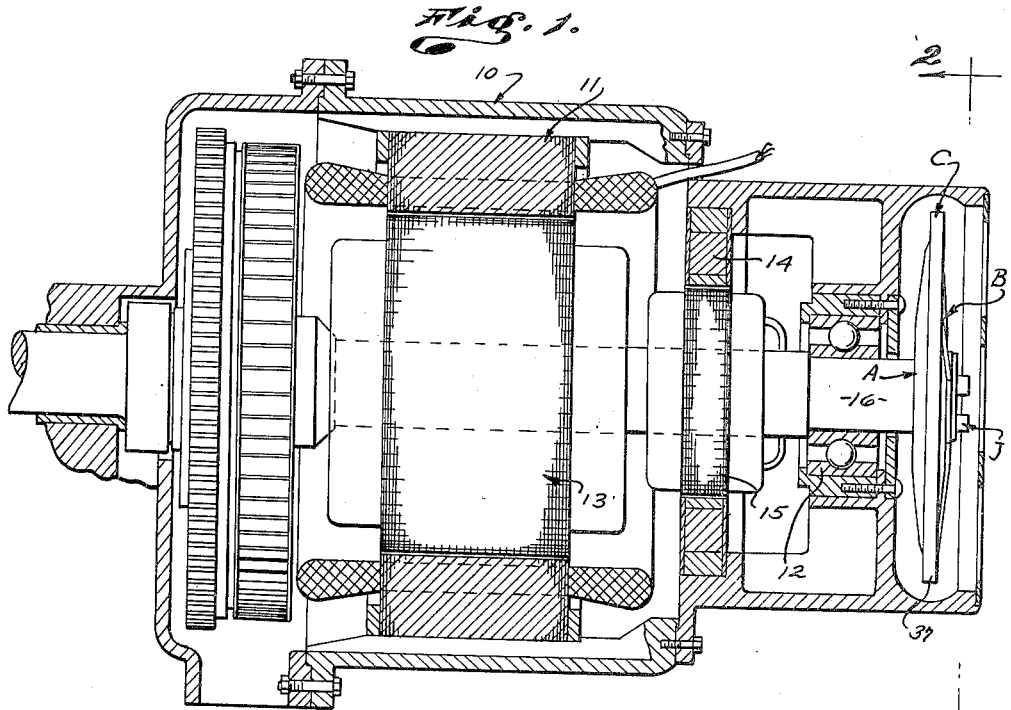

Jan. 5, 1954

M. W. BRAINARD 2,665,398

DRY PLATE TYPE RECTIFIER

Filed April 9, 1951

4 Sheets-Sheet 1

INVENTOR.
Maurice W. Brainard
BY
Attorney

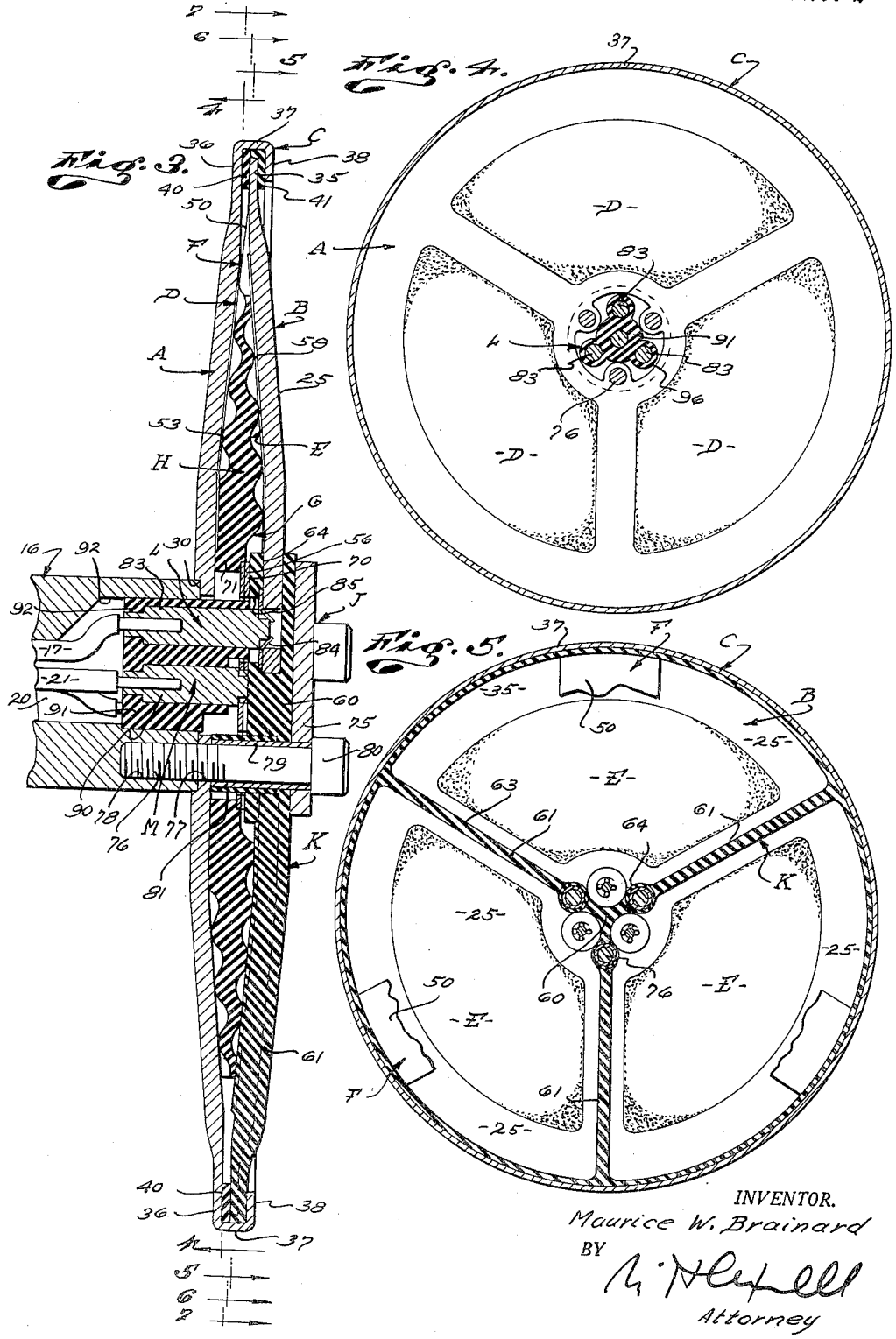

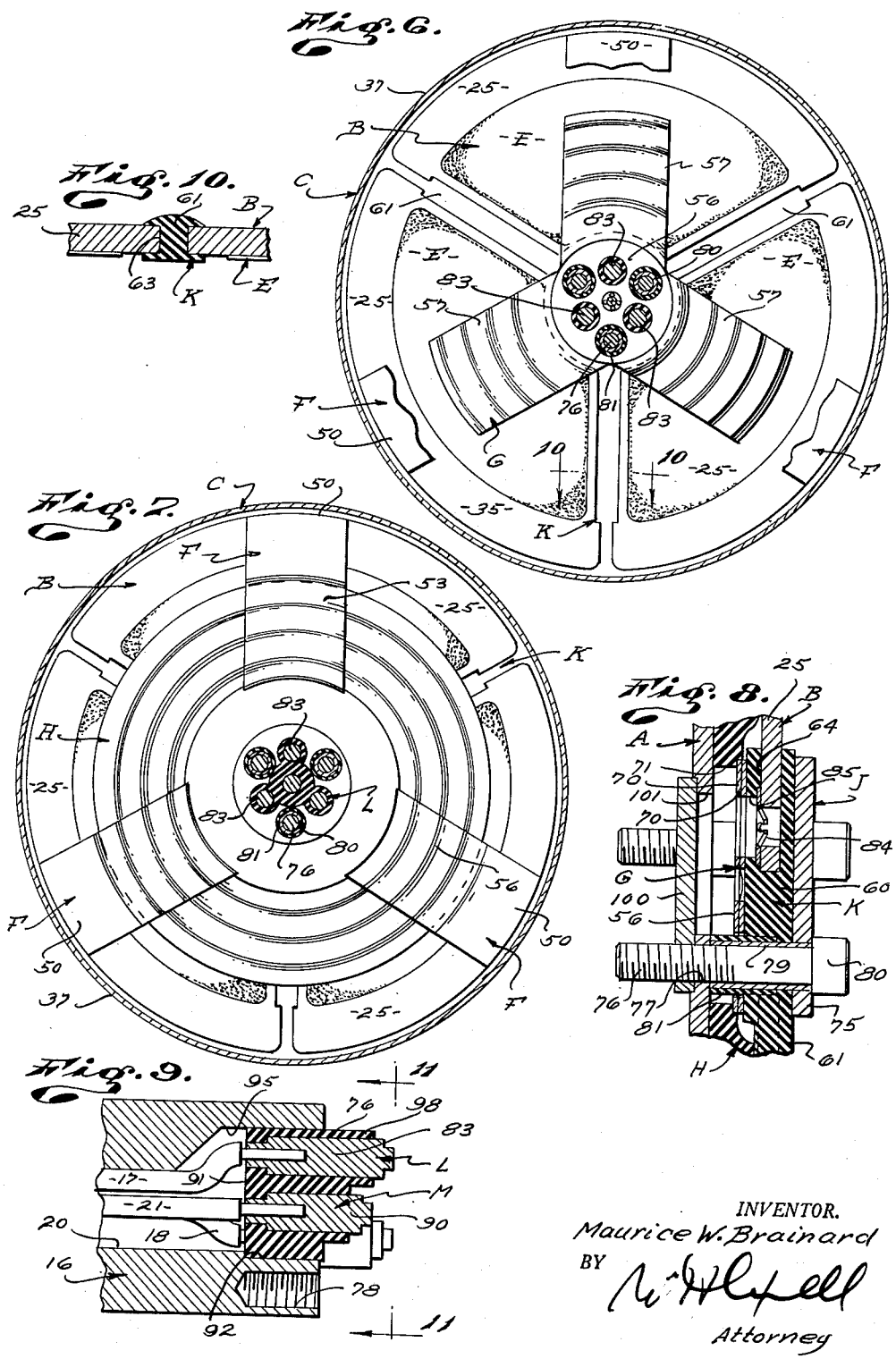

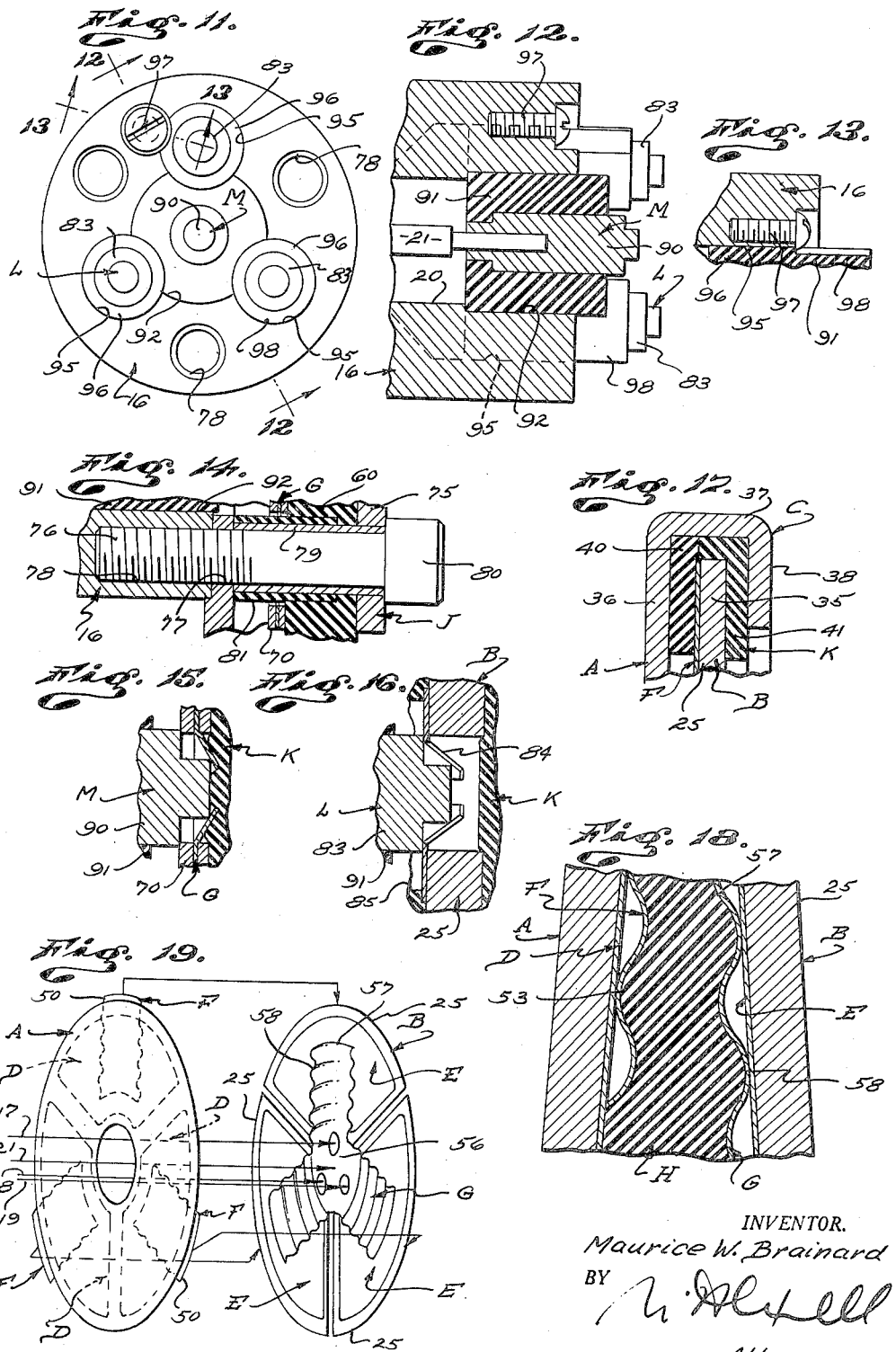

Patented Jan. 5, 1954

2,665,398

UNITED STATES PATENT OFFICE 2,665,398

DRY PLATE TYPE RECTIFIER

Maurice W. Brainard, Los Angeles, Calif., assignor of one-half to O'Keefe & Merritt Company, Los Angeles, Calif., a corporation of California Application April 9, 1951, Serial No. 220,019

24 Claims. (Cl. 317—234)

This invention is concerned with a dry plate type rectifier and it is a general object of the invention to provide a simple, practical, improved rectifier of the type mentioned, suitable for application to or incorporation in electrical machines or apparatus.

The rectifier provided by the present invention is applicable, generally, to electrical equipment and machines. However, it is particularly practical and can be used to advantage in an electric generator of the type wherein there is a field carried by a rotor and an exciter is provided delivering alternating current. The invention will be described as applied to or incorporated in this type of generator. However, it is to be understood that such reference is not to be construed as limiting or in any way restricting the broader features or aspects of the invention since there are aspects of the invention that need not be considered limited to incorporation in a rotary machine.

It is a general object of this invention to provide a rectifier of the general type or form which is set forth and claimed, broadly, in my copending application entitled "Dry Plate Type Rectifier," Serial No. 220,020, filed on even date herewith, having various improvements in the way of the formation, arrangement and construction of parts entering into the structure.

It is a further object of the present invention to provide a rectifier of the general character referred to characterized by few simple, effective parts that make for dependable operation and inexpensive manufacture.

A further object of the invention is to provide a rectifier in which the two principal elements are the base metal elements of the rectifier circuit, one of these being a continuous disc-like plate and the other being a segmental plate in the case of multiphase operation, the elements being opposed and related so that they cooperate to confine the layers of selenium, or other rectifying material, as well as any delicate contacts or the like incorporated in the structure. The unit or composite structure provided by the invention can be used to advantage in various electrical systems or machines, and as its action is not disturbed by movement or rotation, it can be used to advantage in machines where it is incorporated with a rotor or the like.

Another object of the invention is to provide a rectifier of the general character referred to incorporating contacts that engage the rectifying layers and which are of simple, inexpensive form and such as to be highly efficient and dependable in establishing and maintaining the desired electrical connections.

The rectifier, as provided by the present invention, can, if desired, be applied to a shaft such as the rotor shaft of a generator, or the like, and in such case it is preferably applied to an end of such shaft. Further, in such a case, the rectifier is preferably constructed as a sealed unit having electrical connection with other structures or elements by means of detachable contacts or plug connections at the exterior of the sealed parts. In general, for multiphase operation the rectifier involves two principal elements, one a continuous disc-like plate and the other a segmental plate construction made up of a plurality of circumferentially spaced plate sections, the number of which is equal to the number of phases. The two principal elements are spaced apart axially of the rectifier, and a means at the peripheral portion of the rectifier establishes the plates in fixed relation to each other. This means establishes the principal elements as a rigid and permanent assembly and provides electrical insulation between the peripheries of the elements. Circumferentially spaced bodies or layers of rectifying material such as selenium, or the like, are provided on the inner side of the continuous element or plate and a body of such rectifying material is provided on the inner side of each section of the segmental element or plate. Contacts electrically connect the rectifying elements on the continuous plate with the sections of the segmental plate. There may be a contact on each plate section ordinarily at the periphery thereof, which contacts project radially inward and are shaped or formed so as to bear axially and thus remain in effective electrical connection with the rectifying elements on the inner side of the continuous plate. One such contact engages each rectifying element. A single contact makes connection with each of the rectifying elements occurring on the segmental plates of the rectifier and this contact preferably has a central portion occurring at or near the center of the rectifier and has arms that project radially from its center. The arms have pressure or contact engagement with the selenium bodies on the sections of the segmental plate. A spreader occurs between the contacts above described and is preferably a body or ring of rubber, or the like, serving to normally urge the contacts apart and at the same time effectively insulates them from each other.

A carrier is provided for the sections of the segmental plate element and may be considered as a part of the segmental plate element. The carrier is formed of insulating material such as rubber, or the like, and has a center or hub receiving the inner end portions of the plate sections, and it has arms which radiate from the hub and fit between opposed faces of adjacent plate sections. A mounting means is provided for securing the rectifier on a support, for example, on a rotor shaft, and in the preferred form, this means involves a clamp plate that engages the hub of the carrier that holds the plate sections, and screw fasteners that are engaged through the clamp plate and hub, and into threaded sockets in the end of the shaft or support element. Spacers between the continuous plate A and clamp plate limit the extent to which the central portion of the rectifier can be tightened by the action of the screw fasteners. Contact means connect wires carried by the support or shaft with the sections of the segmental plate, so that the multiple phase circuit from the exciter incorporated in the generator is fed to the sections of the segmental plate. A contact means is provided to make connection between a line or lead handling direct current from the single contact that engages the selenium bodies on the sections of the segmental plate. The several contact means preferably involve detachable or releasable plug elements making the rectifier detachable from its support as a complete unit.

Figure 2:
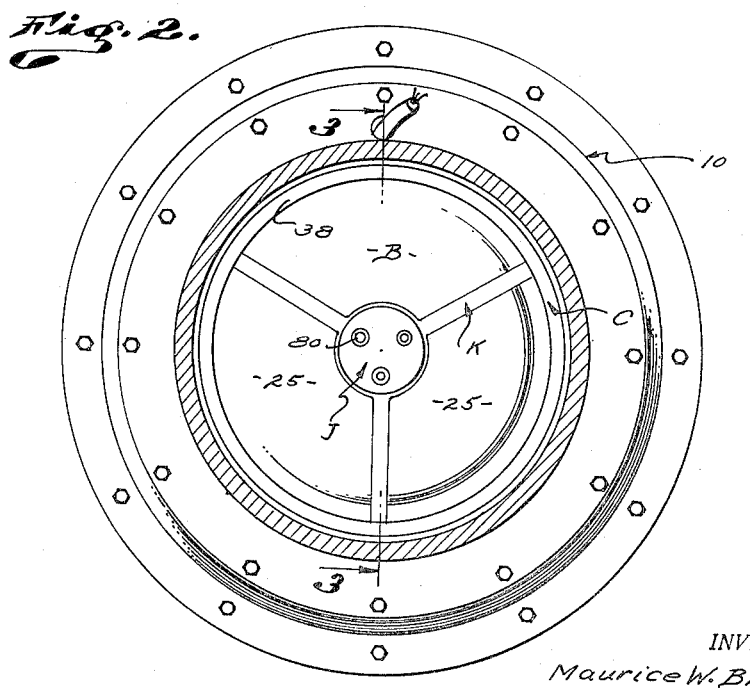

The various objects and features of my invention will be fully understood from the following detailed description of a typical preferred form and application of the invention, throughout which description reference is made to the accompanying drawings, in which:

Fig. 1 is a longitudinal sectional view of a rotary electric machine in the form of a generator wherein there is a rotating field carried by the rotor of the machine, and wherein the rectifier of the present invention is carried by the shaft of the rotor. Fig. 2 is a sectional end view of the structure shown in Fig. 1, being a sectional view taken as indicated by line 2—2 on Fig. 1. Fig. 3 is an enlarged sectional view of the rectifier, being a view taken as indicated by line 3—3 on Fig. 2. Fig. 4 is a reduced transverse sectional view taken as indicated by line 4—4 on Fig. 3. Fig. 5 is a reduced transverse sectional view taken as indicated by line 5—5 on Fig. 3. Fig. 6 is a reduced transverse sectional view taken as indicated by line 6—6 on Fig. 3. Fig. 7 is a reduced transverse sectional view taken as indicated by line 7—7 on Fig. 3. Fig. 8 is a sectional view taken at the central portion of the rectifier showing the rectifier removed from the rotor shaft and having a sealing plate applied thereto and held by fasteners of the mounting means. Fig. 9 is a sectional view showing the end portion of the rotor shaft as it appears in Fig. 3 of the drawings, with the rectifier removed therefrom. Fig. 10 is an enlarged detailed sectional view taken as indicated by line 10—10 on Fig. 6. Fig. 11 is an end view of the structure shown in Fig. 9, being a view taken as indicated by line 11—11 on Fig. 9. Fig. 12 is a sectional view taken as indicated by line 12—12 on Fig. 11. Fig. 13 is a sectional view taken as indicated by line 13—13 on Fig. 11. Fig. 14 is an enlarged detailed sectional view of a portion of Fig. 3 taken at one of the screw fasteners involved in the mounting means by which the rectifier is secured to the rotor shaft. Fig. 15 is an enlarged detailed view illustrating the manner in which contact is made with the contact of the rectifier that engages the selenium sections on the several sections of the segmental plate. Fig. 16 is an enlarged detailed view illustrating the manner in which contact is made with the sections of the segmental plate. Fig. 17 is an enlarged detailed sectional view taken at the rim or periphery of the assembly, showing the manner in which the plate elements are connected together and insulated from each other. Fig. 18 is an enlarged view of a portion of the structure illustrated in Fig. 3, showing the manner in which contact is made with the selenium bodies occurring on the plate elements of the structure, and Fig. 19 is a diagrammatic view illustrating the electrical circuit incorporated in the rectifier.

The rectifier that I have provided can be used in various electrical systems or apparatus. Though the rectifier can be used in situations where it is normally stationary or fixed, it can be used to advantage in rotary electrical machines and for purpose of example it will be described in connection with or as applied to an electrical generator wherein there is a casing 10 carrying a fixed armature 11, and in which there is a rotor with a shaft 16 supported through suitable bearings 12. The shaft carries field elements 13 operating within the armature 11. An exciter is incorporated in the machine and is shown as including an element 14 fixed in the casing and an element 15 carried by the shaft 16 which is mounted in the bearings 12 and which carries the element 13. The output from the exciter may be a single-phase current, however, it is preferably a multiple phase alternating current and is shown as carried by wires 17, 18 and 19, that extend through a central opening 20 in the shaft 16 to the end of the shaft where I locate the rectifier. The rectifier that I have provided converts the alternating current from the exciter to direct current and feeds or supplies the field elements 13 of the generator through a circuit one side of which may be ground while the other side is carried by a wire 21 that passes through the opening 20 of the shaft 16.

The rectifier embodying the present invention involves, generally, two main conductive elements A and B forming the base plates of the rectifier. The element A is a continuous or unitary plate, preferably disc-shaped in form, while the element B is, in the usual case of multiphase operation, a segmental plate construction involving a plurality of circumferentially spaced plate sections 25. It will be understood, of course, that if single-phase exciter operation is used, the plate B need not be separated into separate segments, for a unitary plate B would suffice for single phase operation. A means C mechanically connects the peripheral portions of the elements A and B establishing these elements in or as a permanent rigid assembly in which the elements A and B are insulated electrically from each other.

For the usual case of multiphase operation circumferentially spaced layers D of the rectifying material, such as selenium, or the like, are provided on the inner side of the main element A and a body E of selenium, or the like, is provided on the inner side of each section 25 of the segmental plate element B. In single phase operation, there would, of course, be needed only a single rectifying layer on plate A and only a single segment or plate B carrying a rectifier layer.

Contacts F connect the rectifying layers D with the plate sections 25 so that each plate section 25 is electrically connected with one of the rectifying layers D. A single contact G makes connection with each of the rectifying layers E and a resilient insulating means H insulates the several contacts F from the contact G and normally urges the contacts F and G apart and into efficient electrical contact with the respective rectifying layers.

A mounting means J secures the rectifier on the shaft 16 and a carrier K of insulating material is preferably provided and is so combined with the plate sections 25 as to be, in effect, a part of the element B. Electrical connections L connect the wires 17, 18 and 19 in the shaft carrying alternating current with plate sections 25 of element B, and an electrical connection M connects the field wire in the shaft 16 with the single contact G and handles one side of the direct current from the rectifier, the other side of that circuit being shown grounded through direct engagement of the main element A with the shaft 16.

The main element A is preferably a simple disc-shaped plate having a central socket 30 receiving the end of shaft 16 so the plate has direct and effective electrical connection with the shaft and is effectively supported thereby in the manner shown throughout the drawings. Where the plate is round, as shown in the drawings, and where the rectifier is to rotate, as with a shaft or the like, it is preferably mounted on the shaft to be concentric therewith.

The main element B includes metal sections 25, sufficient in number to correspond to the number of phases, and for more than a single phase, are preferably segmental in form and are circumferentially spaced to establish a series around the central axis of the rectifier. Where the rectifier receives a three-phase alternating current, it is preferred to provide three plate sections 25, and it is preferred to form and proportion these plate sections substantially as shown throughout the drawings.

So far as the broader aspects of the present invention are concerned, the plate elements A and B may be flat or substantially flat, in which event they are spaced apart axially far enough to accommodate the parts that are between these elements, as will be hereinafter described. In the particular case illustrated, however, the plates A and B are, in effect, slightly dished or cup-shaped, so that they are substantially concavo-convex and they are oppositely disposed so that their concave sides are opposed, as clearly illustrated in Fig. 3 of the drawings. Through this construction the outer or rim portions of the elements A and B may closely approach each other, while the central portions are spaced a substantial distance apart to accommodate structure occurring at the central portion of the rectifier.

The means C connecting the peripheral portions of the elements A and B may be varied widely in form and construction, it being preferred that it be such as to rigidly and permanently join the elements A and B at the rim or periphery of the rectifier, and it is such as to electrically insulate the elements A and B from each other. In the case illustrated, the means C involves flat radially projecting flange portions 35 on the peripheral extremities of the plate sections 25 and a like flange 36 is provided on the peripheral extremity of the plate element A. An annular axially disposed rim 37 projects from the outermost edge of flange 36 in the direction of element B to extend axially over the flanges 35. A radially disposed lip 38 projects inwardly from the extremity of the rim 37 so that the flanges 35 or portions thereof are confined between the flange 36 and the lip 38 within the rim 37.

The means C provides for electrical insulation of the elements A and B and in the case illustrated insulator sections occur in the structure just described, there being an annular insulator section 40 arranged between the flanges 35 and 36, while an annular insulator section 41 is arranged between the flanges 35 and the lip 38. One or the other of these insulator sections overlies the outer peripheral edges of the flanges 35.

The bodies D of selenium provided on the inner side or face of base plate A may be secured or deposited thereon in any suitable manner, and although I refer to them as selenium, it is to be understood that they may be of any suitable material or combination of materials having the general electrical rectifying characteristics of selenium. For example, in practice, I may employ material such as copper oxide, magnesium copper sulphide, etc. When I use the term "selenium" I mean to include any like or equivalent material or combination of materials. The selenium bodies may be considered as being deposited on the base metal elements of the structure, and in the case of the bodies D they are spaced apart circumferentially, and in the case illustrated there are three such bodies equally spaced around the plate A. It will be understood that the rectifying layers or bodies include all parts required for rectification; for example, in the case of selenium elements the usual counterelectrode forming the well known barrier layer at the selenium surface will be used. As the construction of such rectifying elements and the theory of their operation is well known in the art, no detailed description is needed here.

The bodies E of selenium are provided on the sections 25 of the segmental plate element B, there being one body E of selenium on each plate section at the inner side thereof.

The contacts F that connect the selenium bodies D and the plate sections 25 are circumferentially spaced and there is one contact F engaged with each plate section 25 and it makes contact with one of the selenium bodies D. In the preferred form of the invention, each contact F is electrically connected to the peripheral portion of a plate section 25, in fact, it is preferably in direct contact or engagement with the plate section, and it projects radially inward and somewhat axially from the point where it engages the plate section 25. In the case illustrated in the drawings, and which is best shown in Fig. 7 of the drawings, the contact F is elongate in form and is formed of or by a sheet or leaf of sheet metal. The outer end portion 50 of the contact is in direct engagement with the flange 35 of the plate section 25, and in practice it may be held by the clamping action that occurs at the periphery of the rectifier or it may be directly and permanently joined thereto as by soldering, or the like.

The contact F projects radially inward from the point where the end 50 is secured and it projects somewhat axially so that it bears against and contacts a selenium body D on the inner side of plate element A. The contact F is clear of or does not contact the selenium body E on its supporting plate section 25, as will be understood from Fig. 3 of the drawings.

In the preferred form of the invention, the plate or leaf forming the contact F may be plain or flat and bear against the selenium body D. However, it is preferred that it be preformed as shown in the drawings where it is illustrated as being crimped or corrugated, the corrugations being in any direction to have a spring action to maintain contact pressure. As a result of this formation, the contact F has a plurality of crest portions 53 which bear upon or contact the selenium body D. If the contact F is flat it may be necessary to depend upon the insulator H or some other means to maintain the contact pressure.

The single contact G makes electrical connection with each of the several selenium bodies E. In its preferred form, the contact G is formed of a sheet of thin flexible metal so that it is in the form of a plate or leaf and although it may be of simple plate or disc form it is preferably formed with a central portion 56 at the center of the rectifier and with radially projecting arms 57 which are circumferentially spaced and which project radially outward from the center 56.

The center 56 of the contact G is held in a predetermined position at the central portion of the rectifier through structure that will be hereinafter described. The arms of the contact G project radially outward from the center 56 and they preferably bear axially so that they are in pressure engagement with the selenium bodies E on each plate section 25. The arms 57 may be simple flat contacts bearing against the selenium bodies or they may be formed as shown in the drawings where they are illustrated as crimped or corrugated to have crests 58 which engage and make suitable contact with the selenium bodies E. In the case illustrated, where the rectifier is handling a three phase alternating current circuit, there are three plate sections 25, and consequently, there are three arms 57 on contact G, one for engaging the selenium body on each plate section 25.

Means H in the form of a spreader is provided between the contact G and the several contacts F. In the preferred form of the invention, the spreader is a ring or annular body of resilient insulating material such, for example, as rubber or a rubber-like material, and it is of such extent as to extend from the central portion 56 of contact G radially outward to or possibly just beyond the outer ends of the contact arms 57. When the spreader is formed of rubber or rubber-like material, it may be mounted or shaped to suitably fit the corrugations of the contacts F and arms 57 of contact G, or it may be a plain sheet which takes the contour of the contacts F and arms 57 when in place as shown in Fig. 3. In either case, it is preferred in practice to so proportion the parts that when the structure is fully assembled, as shown in Fig. 3, the spreader H is under compression between the contacts F and arms 57 and consequently exerts pressure that constantly maintains the contacts F in engagement with the selenium bodies D and the arms 57 in engagement with the selenium bodies E. This pressure or holding action may be the sole pressure provided for maintaining the desired contacts or it may supplement the pressure or holding action resulting from the general shape or disposition of the contacts.

The carrier K, preferably incorporated in the construction, may be so related to or combined with the plate sections 25 as to be, in effect, a part of the main element B of the rectifier. The carrier, as shown in the drawings, if preferably formed of electrical insulating material such as rubber or a rubber-like composition, and it has a center or hub portion 60 receiving the inner end portions of the plate sections 25 and forming an abutment for the center portion 56 of contact G. The carrier is further provided with a plurality of radially projecting ribs 61 which are between and serve to separate adjacent plate sections 25. In a preferred construction, the ribs extend continuously from the hub 60 to the peripheral portion of the rectifier where they may be advantageously joined to the insulator section 41, in which case the insulator section 41 is, in effect, a part of the carrier.

With the construction just described, which is illustrated in the drawings and which is best shown in Fig. 5, the combination of the center portion 60, ribs 61 and insulator section 41, form frames which receive and hold the plate sections 25. It is preferred in practice that the ribs 61 be provided with grooves or channels 63 into which the radial edges of the plate sections 25 fit, and the center 60 is preferably provided with outwardly opening grooves or sockets 64 into which the inner end portions of the plate sections 25 fit. From the foregoing description, it will be apparent that outer peripheral portions are held through the construction provided at means C.

The central portion 56 of contact G is preferably held in a predetermined position at the center of the rectifier, and in the preferred form of the invention, this portion of the contact G is reinforced by stiffening rings 70 fixed to the sides of the center portion 56. That portion of the contact G which is stiffened by the rings 70 is held between the center 60 of carrier K and the inner portion 71 of the spreader H.

The mounting means J is provided for securing the rectifier, as hereinabove described, to the shaft 16, preferably at the end of the shaft. In the case illustrated, the means J involves a clamp plate 75 applied to or engaged with the center portion 60 of the carrier K, and one or more fasteners extend between the clamp plate and the shaft. In the case illustrated, a plurality of screw fasteners 76, in the form of retaining screws, extend through the plate 75 through the center 60 of carrier K and through openings 77 in the plate element A to be threaded into sockets 78 provided in the end of shaft 16. Spreaders in the form of sleeves 79 are preferably provided on the screw fasteners 76 between the plate element A and the heads 80 of the screw fasteners to limit the extent to which the assembly can be clamped by tightening the fasteners.

In accordance with the invention, a sleeve 81 of insulating material is provided around each spacer 79 and extends through an opening in the stiffened central portion of contact G so that there is no grounding of the current carried by contact G where the screw fasteners extend through the contact G. It is to be understood that, in practice, the various parts of the center portion of the rectifier may be proportioned so that, when the several screw fasteners are made tight, the portion of the center 60 of carrier K beneath the plate 75 is clamped and tightly sealed with the plate sections 25 and the plate element A is tightly held in engagement with the end of the shaft 16.

The contact means L, provided to establish the desired electrical connection between the wires 17, 18 and 19, and the plate sections 25, includes pin contacts 83 on the terminal ends of the wires in the shaft 16 for carrying the three phase circuit from the exciter. The pin contacts 83 cooperatively engage or make contact with contact plates 84 fixed to the inner portions of the plate sections 25. The plate contacts 84 are preferably flexible or resilient sheet metal plates that are deflected by the pin contacts when the structure is fully assembled, and in the preferred construction, the portions of the plate contacts 84 that are engaged by the pin contacts occur at openings or cavities 85 provided in the center 60, as shown in the drawings. The pin contacts 83, in reaching the plate contacts 84, extend through openings in the reinforced center portion of the contact G.

The contact M, connecting wire 21 and the contact G, involves a pin contact 90 on the terminal end of the wire 21, which pin contact directly engages the center portion of the contact G, as clearly shown in Figs. 3 and 15 of the drawings.

In practice, it is preferred to support the several pin contacts, just described, in a plug 91 of insulating material such as Bakelite or hard rubber, or the like, and it is preferred to engage or support the plug in a central socket opening 92 provided in the shaft 16 from the end which carries the rectifier. In the preferred arrangement of pin contacts, contact 90 is located on the center axis of the rectifier, while the contacts 83 are circumferentially spaced around contact 90. In the preferred form of construction as shown in Figs. 11, 12 and 13, the socket 92 in the shaft has lateral extensions 95 which accommodate laterally projecting portions 96 of the plug that carry the pin contacts 83, and a retaining screw 97 is threaded to the end portion of the shaft to overlap the plug and thereby retain it in position in the socket, see Fig. 13. Further, in practice, it is preferred to provide the plug 91 of insulating material with sleeve-like extensions 98 which surround the pin contacts 83 where they extend through the central portion of contact G.

With the general construction and arrangement of parts hereinabove described, and when three screw fasteners 76 are employed in the mounting means J, they are located to extend through the carrier K where the inner ends of the ribs 61 connect to the center or hub 60 and the screw fasteners extend through holes 77 suitably located in the plate A. It will be apparent that through this construction the screw fasteners may be employed as orienting or locating members during assembly of the structure so that as the various parts are assembled they properly register or cooperatively engage. It is to be understood that, as the assembly operation is being performed, the lip 38 is axially disposed and is, in effect, a continuation of rim 37, and a final operation in assembly involves the inward turning of the lip to a position, such as is shown in Fig. 3, where it permanently clamps the parts in an assembled position.

With the construction hereinabove described, the rectifier, apart from the contacts carried by the shaft or other support, is a unit that can be readily handled apart from the electrical machine or apparatus in which the rectifier is employed, and during transportation or handling of the rectifier, it can be maintained in a sealed and protected condition by applying a sealing plate 100 to the central portion of the plate element A to close the opening 101 occurring at the center of plate A. The sealing member 100 can be retained in sealing position by the screw fastener 76, as clearly illustrated in Fig. 8 of the drawings.

Since the rectifier may be used where it is stationary and not a part of a rotor, the device or structure used to support it need not be a shaft. For this reason, when I use the term "shaft," I do not intend it to be construed in a limited sense, but rather that it be used to mean any device or part that may be used as a support, carrier, or mounting for the rectifier.

The various elements or parts entering into the rectifier, as hereinabove described, may be sealed or bonded together to form a continuously sealed or bonded unit. In such case, the insulating material provided at or incorporated in the means C, the material of the spreader H and the material of the carrier K, may be an insulating material that can be permanently bonded to the metal parts. In practice I may employ a so called "plastic" or a rubber-like material subject to being bonded to metal by suitable application of heat, or I may employ any suitable insulating material and a suitable adhesive or bonding agent. In practice, if a material subject to bonding by heat is used, after the rectifier has been completely assembled and is ready for application of the shaft of the electric machine, I may subject it, or desired parts of it, to heat treatment which results in bonding or vulcanizing of the various insulating parts to the metal parts contacted thereby.

If bonding is to be employed, with the particular construction that I have described and which is shown in the drawings, the sections of insulation at the periphery of the rectifier and incorporated in the means C are bonded to and consequently sealed with the various parts of the plate A, and plate sections 25 occurring at the periphery of the structure and portions of the contacts F entering beneath insulator section 40 are bonded thereto. The spreader H occurring between contacts F and G is bonded to the opposed sides of these parts where the spreader occurs and the portion of the spreader that contacts plate A is bonded thereto. Further, the carrier K is bonded to the metal parts contacted thereby, the ribs 61 being bonded to the plate sections 25, and the center of the carrier being bonded to the inner portions of the plates 25 at the inner and outer sides thereof. Further, the insulating sleeves of the mounting means occurring around the spacers are bonded to the center of the carrier K. In practice, heat treatment necessary to effect the desired bonding may be applied to the assembled rectifier without in any way injuring or impairing the metal parts or rectifying elements employed in the construction.

From the foregoing description, it is believed that the rectifying action of the structure converting alternating current to direct current, will be fully understood, the general circuit of the rectifier being diagrammatically illustrated in Fig. 19 of the drawings.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A rectifier adapted to be carried by a shaft including, a continuous base plate and a segmental base plate having a plurality of spaced sections, a rectifying element on each of said sections, spaced rectifying elements on the continuous plate, an electrical contact means electrically connecting together all the rectifying elements on said spaced sections, and means electrically connecting each of said sections with a respective one of the rectifying elements on the continuous plate.

2. A rectifier adapted to be carried by a shaft including, a continuous base plate and a segmental base plate having a plurality of spaced sections, a rectifying element on each of said sections, spaced rectifying elements on the continuous plate, an electrical contact means electrically connecting together all of the rectifying elements on the said spaced sections, and separate contact means electrically connecting each of said sections with a respective one of the rectifying elements on the continuous plate, the said base plates being spaced apart axially of the rectifier and said contact means and rectifying elements being located between the said base plates.

3. A rectifier adapted to be carried by a shaft including, a continuous disc-shaped plate and a segmental disc-shaped base plate having a plurality of spaced sections, means connecting the said plates together at their peripheries and electrically insulating them from each other, a rectifying element on each of said sections, spaced rectifying elements on the continuous plate, a single contact means electrically connecting together all of the rectifying elements on the said spaced sections, and separate contact means electrically connecting each of said sections with a respective one of the rectifying elements on the continuous plate.

4. A rectifier adapted to be carried by a shaft including, a continuous base plate and a segmental base plate having a plurality of spaced sections, a rectifying element on each of said sections, spaced rectifying elements on the continuous plate, an electrical contact means electrically connecting together all the rectifying elements on the said spaced sections, separate contact means electrically connecting each of said sections with a respective one of the rectifying elements on the continuous plate, and a spreader engaged between the said electrical contact means and the said separate contact means connected to the sections and maintaining them in pressure engagement with said rectifying elements.

5. A rectifier adapted to be carried by a shaft including, a continuous base plate and a segmental base plate having a plurality of spaced sections, a rectifying element on each of said sections, spaced rectifying elements on the continuous plate, an electrical contact means electrically connecting together all the rectifying elements on the said sections, separate contact means electrically connecting each of said sections with a respective one of the rectifying elements on the continuous plate, and a spreader of rubber-like material engaged between the said electrical contact means and the separate contact means connecting the sections and maintaining them in pressure engagement with said rectifying elements.

6. A rectifier adapted to be carried by a shaft including, a continuous base plate and a segmental base plate having a plurality of spaced sections, a rectifying element on each of said sections, spaced rectifying elements on the continuous plate, and electrical contact means electrically connecting together all the rectifying elements on the said sections, separate contact means electrically connecting each of said sections with a respective one of the rectifying elements on the continuous plate, the said plates being spaced apart axially of the rectifier and the said contact means and said rectifying elements being located between the said plates, and a spreader engaged between said electrical contact means and the separate contact means connected to the sections and maintaining them in pressure engagement with said rectifying elements.

7. A rectifier adapted to be carried by a shaft including, two disc-shaped plates spaced apart axially of the rectifier, one a continuous base plate and the other a segmental base plate and a plurality of circumferentially spaced sections, a rectifying element on the inner side of each of said sections, a plurality of circumferentially spaced rectifying elements on the inner side of the continuous plate, an electrical contact means between said plates and making electrical contact with the rectifying elements on the said sections, and separate contact means between the plates, one for each of said sections and electrically connecting with a rectifying element on the continuous plate.

8. A rectifier adapted to be carried by a shaft including, two disc-shaped plates spaced apart axially of the rectifier, one a continuous base plate and the other a segmental base plate having a plurality of circumferentially spaced sections, a rectifying element on the inner side of each of said sections, a plurality of circumferentially spaced rectifying elements on the inner side of the continuous plate, an electrical contact means between said plates and making electrical contact with the rectifying elements on the said sections, separate contact means between the plates, one for each of said sections and electrically connecting with a rectifying element on the continuous plate, and means connecting the peripheries of the said plates and electrically insulating the plates from each other.

9. A rectifier adapted to be carried by a shaft including, a continuous base plate and a segmental base plate including a plurality of spaced sections, a rectifying element on each of said sections, spaced rectifying elements on the continuous plate, an electrical contact means electrically connecting together all the rectifying elements on the said sections, separate contact means electrically connecting each of said sections with a respective one of the rectifying elements on the continuous plate, and a carrier of electrical insulating material engaged between adjacent sections of the segmental plate.

10. A rectifier adapted to be carried by a shaft including, two disc-shaped plates spaced apart axially of the rectifier, one a continuous base plate and the other a segmental base plate having a plurality of circumferentially spaced sections, a rectifying element on the inner side of each of said sections, a plurality of circumferentially spaced rectifying elements on the inner side of the continuous plate, an electrical contact means between said plates and making electrical contact with the rectifying elements on the said sections, separate contact means between the plates, one for each of said sections and electrically connecting it with a rectifying element of the continuous plate, and a carrier of insulating material engaged between and separating adjacent sections of the segmental plate.

11. A rectifier adapted to be carried by a shaft including, a continuous base plate and a segmental base plate having a plurality of spaced sections, a rectifying element on each of said sections, spaced rectifying elements on the continuous plate, an electrical contact means electrically connecting together all the rectifying elements on the said sections, and means electrically connecting each of said sections with a respective one of the rectifying elements on the continuous plate, said means being supported to have portions bearing toward the rectifying elements to stay in contact therewith.

12. A rectifier adapted to be carried by a shaft including, a continuous base plate and a segmental base plate having a plurality of spaced sections, a rectifying element on each of said sections, spaced rectifying elements on the continuous plate, an electrical contact means electrically connecting together all the rectifying elements on the said sections, and means electrically connecting each of said sections with a respective one of the rectifying elements on the continuous plate, the means being in the form of sheets corrugated to have crests contacting the rectifying elements.

13. A rectifier adapted to be carried by a shaft including, a continuous base plate and a segmental base plate having a plurality of spaced sections, a rectifying element on each of said sections, spaced rectifying elements on the continuous plate, an electrical contact means electrically connecting together all the rectifying elements on the said sections, separate contact means electrically connecting each of said sections with a respective one of the rectifying elements on the continuous plate, and a spreader engaged between the electrical contact means and the said separate contact means and maintaining them in pressure engagement with the rectifying elements, the said contact means being in the form of sheets corrugated to have crests contacting the rectifying elements.

14. A rectifier adapted to be carried by a shaft including, a continuous base plate and a segmental base plate having a plurality of spaced sections, a rectifying element on each of said sections, spaced rectifying elements on the continuous plate, an electrical contact means electrically connecting together all the rectifying elements on the said sections, separate contact means electrically connecting each of said sections with a respective one of the rectifying elements on the continuous plate, and a unit of electrical insulating material having frame-like portions in which the said sections are located.

15. A rectifier adapted to be carried by a shaft including, a continuous base plate and a segmental base plate having a plurality of spaced sections, a rectifying element on each of said sections, spaced rectifying elements on the continuous plate, an electrical contact means connecting together all the rectifying elements on the said sections, separate contact means electrically connecting each of said sections with a respective one of the rectifying elements on the continuous plate, and mounting means securing the rectifier to the shaft and including screw fasteners engaged through the said plates and the electrical contact means and having threaded engagement with the shaft.

16. A rectifier adapted to be carried by a shaft including, two disc-shaped plates spaced apart axially of the rectifier, one a continuous base plate and the other a segmental base plate including a plurality of circumferentially spaced sections, a rectifying element on the inner side of each of said sections, a plurality of circumferentially spaced rectifying elements on the inner side of the continuous plate, an electrical contact means between said plates and making electrical contact with the rectifying elements on the said sections, separate contact means between the plates, one for each of said sections and electrically connecting it with a rectifying element on the continuous plate, and mounting means securing the rectifier to the shaft including a screw fastener engaged through the said plates and the said electrical contact means and threaded to the shaft.

17. A rectifier adapted to be carried by a shaft including, two disc-shaped plates spaced apart axially of the rectifier, one a continuous base plate and the other a segmental base plate including a plurality of circumferentially spaced sections, a rectifying element on the inner side of each of said sections, a plurality of circumferentially spaced rectifying elements on the inner side of the continuous plate, an electrical contact means between said plates and making electrical contact with the rectifying elements on the said sections, separate contact means between the plates, one for each of said sections and electrically connecting it with a rectifying element on the continuous plate, and mounting means securing the rectifier to the shaft including a clamp plate, and a screw fastener holding the clamp plate and engaged through the said disc-shaped plates and the said electrical contact means and threaded to the shaft.

18. A rectifier adapted to be carried by a shaft including, two disc-shaped plates spaced apart axially of the rectifier, one a continuous base plate and the other a segmental base plate including a plurality of circumferentially spaced sections, a rectifying element on the inner side of each of said sections, a plurality of circumferentially spaced rectifying elements on the inner side of the continuous plate, an electrical contact means between said plates and making electrical contact with the rectifying elements on the said sections, separate contact means between the plates, one for each of said sections and electrically connecting it with a rectifying element on the continuous plate, and mounting means securing the rectifier to the shaft including a clamp plate, a spacer between the clamp plate and the shaft, and a screw fastener holding the clamp plate and engaged through the said disc-shaped plates and the said electrical contact means and threaded to the shaft.

19. A rectifier adapted to be carried by a shaft including, two disc-shaped plates shaped apart axially of the rectifier, one a continuous base plate and the other a segmental base plate including a plurality of circumferentially spaced sections, a rectifying element on the inner side of each of said sections, a plurality of circumferentially spaced rectifying elements on the inner side of the continuous plate, and electrical contact means between said plates and making electrical contact with the rectifying elements on the said sections, separate contact means between the plates, one for each of said sections and electrically connecting it with a rectifying element on the continuous plate, and mounting means securing the rectifier to the shaft including a clamp plate, a spacer between the clamp plate and the shaft, and a screw fastener holding the clamp plate and engaged through the spacer, through said disc-shaped plates, and through the said electrical contact means and threaded to the shaft.

20. A rectifier adapted to be carried by a shaft including, a continuous base plate and a segmental base plate having a plurality of spaced sections, a rectifying element on each of said sections, spaced rectifying elements on the continuous plate, an electrical contact means electrically connecting together all the rectifying elements on the said sections, means electrically connecting each of said sections with a rectifying element on the continuous plate, an electrical insulation including parts separating the plates at the periphery of the rectifier, parts at the central portion of the rectifier and parts between adjacent sections of the segmental plate, the said parts of insulation being bonded to the portions of the structure engaged thereby.

21. A dry rectifier assembly adapted for mounting on a rotatable shaft, comprising a pair of electrically conducting plates axially spaced apart with reference to the axis of rotation and adapted to be fixed to the shaft at the axis, a first of said plates having a rectifying element adherent thereto and facing the second of said plates, the second of said plates having a rectifying element adherent thereto and facing the first of said plates, electrical contacting means electrically connecting one of the plates with the rectifying element on the other of the plates, a second electrical contacting means electrically connecting to the rectifying layer of said other plate, and means joining the peripheries of said plates while insulating them from each other.

22. A dry rectifier assembly adapted for mounting on a rotatable shaft, comprising a pair of electrically conducting plates axially spaced apart with reference to the axis of rotation and adapted to be fixed to the shaft at the axis, a first of said plates having a rectifying element adherent thereto and facing the second of said plates, the second of said plates having a rectifying element adherent thereto and facing the first of said plates, electrical contacting means connecting one of the plates with the rectifying element on the other of the plates, a second electrical contacting means connecting to the rectifying element of said other plate, resilient insulating means situated between the two contacting means and urging them apart and into contact with their respective rectifying elements, and means joining the peripheries of said plates while insulating them from each other.

23. A dry rectifier assembly according to claim 22 in which means is provided connecting one of the plates to the shaft, and a contacting means insulated from the shaft makes contact with the other of the plates, whereby an electrical lead from said contacting means can be carried within the shaft.

24. A dry rectifier assembly adapted for mounting on a rotatable shaft, comprising an electrical conducting plate adapted to be connected mechanically and electrically with the shaft, a plurality of separated rectifying elements adherent on one face of said plate, an additional plate means axially spaced from the first-mentioned plate and facing the rectifying elements of said first-mentioned plate, said additional plate means being divided into a plurality of sections insulated from each other, a plurality of rectifying elements adherent respectively to the respective ones of said sections on the side thereof facing the first plate, an electrically conductive contacting means held against the surface of each rectifying element of the first plate and extending to a corresponding one of the segments, and contacting means held against the surface of the rectifying element on each of the segments and electrically connecting said last-mentioned elements together.

MAURICE W. BRAINARD.

References Cited in the file of this patent

UNITED STATES PATENTS

| Number | Name | Date |
| --- | --- | --- |
| 2,247,753 | Hansell | July 1, 1941 |
| 2,445,805 | Skinker | July 27, 1948 |
| 2,550,710 | Morris | May 1, 1951 |